United States Patent [19]

De Pedro et al.

[11] Patent Number: 5,556,659

[45] Date of Patent: Sep. 17, 1996

[54] PREPARATION OF REDUCED-CALORIE COATED FROZEN CONFECTIONERY

[75] Inventors: Mayda T. De Pedro, Canoga Park; Fe S. Estiandan, Northridge; Michael L. Talbot, Valencia, all of Calif.; Helmut Traitler, Corseaux, Switzerland

[73] Assignee: Nestec S.A., Vevey, Switzerland

[21] Appl. No.: 566,164

[22] Filed: Dec. 1, 1995

Related U.S. Application Data

[63] Continuation of Ser. No. 149,996, Nov. 10, 1993, abandoned.

[51] Int. Cl.$^6$ ........................................ A23G 9/04
[52] U.S. Cl. .................. 426/302; 426/100; 426/101; 426/305; 426/602
[58] Field of Search ........................ 426/101, 89, 91, 426/100, 249, 302, 305, 602, 604, 515, 516, 524

[56] References Cited

U.S. PATENT DOCUMENTS

| | | |
|---|---|---|
| 2,747,525 | 5/1956 | Lund ........................ 426/249 |
| 4,238,520 | 12/1980 | Miller et al. . |
| 4,425,369 | 1/1984 | Sakamoto et al. . |
| 4,637,937 | 1/1987 | Terada et al. . |
| 4,985,263 | 1/1991 | Klug ........................ 426/101 |
| 5,017,392 | 5/1991 | Bombardier et al. . |
| 5,132,128 | 7/1992 | Rockland et al. ........... 426/101 |
| 5,160,759 | 11/1992 | Nomura et al. . |
| 5,273,763 | 12/1993 | Merz et al. ............... 426/302 |
| 5,283,070 | 2/1994 | Bertrand ................... 426/249 |
| 5,308,639 | 5/1994 | Fung ....................... 426/602 |
| 5,332,595 | 7/1994 | Gaonkav ................... 426/602 |

FOREIGN PATENT DOCUMENTS 5959149 4/1984 Japan .

OTHER PUBLICATIONS

STN database abstract. AN 84(04):P1001 FSTA. for "Ice Cream Coating " in Industrie Alimentari, 1983, 22(202) 81–85, Author: F. Bray.

STN database abstract. AN 72(02):T0 121 FSTA. for "Control of Viscosity and emulsion stability in foods using modified microcrystalline cellulose. " Food Product Development. 1971, 4(4) 19,20,22 and 26. Author: R. D. McCormick 1992.

STN database abstract. AN 92(11);N0055 FSTA for EP 483414 published 1992.

*Primary Examiner*—Anthony J. Weier
*Attorney, Agent, or Firm*—Vogt & O'Donnell, LLP

[57] ABSTRACT

A reduced-calorie coated frozen confectionery is prepared by coating a frozen confectionery with a water-in-oil emulsion which contains 40% to 55% by weight water, 2% to 4% by weight of an emulsifier system that includes decaglycerine decaoleate, and less than about 3% by weight water-soluble compounds.

11 Claims, No Drawings

PREPARATION OF REDUCED-CALORIE COATED FROZEN CONFECTIONERY

This is a continuation of application Ser. No. 08/149,996, filed Nov. 10, 1993, now abandoned.

BACKGROUND OF THE INVENTION

The present invention relates to a water-in oil emulsion based coating and its applications as internal and external substitute for conventional fat in frozen desserts. It further relates to a method of coating a frozen confectionery product, for example, ice confectionery.

In a coated frozen confectionery product, for example an ice lolly, bar, morsel, cone, cup or cake, the largest portion of the calories in a typical fat-based coating comes from the fat, which may account for some 45–60% by weight of the coating. It would be desirable to substantially reduce the amount of calories in a coated confectionery product by producing a low calorie coating with a reduced fat content.

The difficulties in devising a low calorie coating composition is that it must have similar organoleptic properties to conventional fat-based coatings, in particular good snap, chocolate flavor and unctuous, creamy mouthfeel, suitable functionality, in particular high viscosity and good storage and heat-shock resistance for being able to be processed in a coating operation.

U.S. Pat. No. 5,017,392 discloses a process for coating a frozen confectionery product in which the coating composition is calorie reduced in that it is sugar-free, contains aspartame, mannitol and polydextrose as sugar replacer and contains cocoa butter and a vegetable fat.

Japanese Patent 59-59149 discloses there is disclosed a reduced calorie composition for enrobing ice confectionery based on a water-in oil emulsion, in which the emulsifier system is a combination of polyglycerine condensed ricinoleic acid ester as major emulsifier and one of glycerine fatty acid ester, sorbitan fatty acid ester or lecithin as sub-emulsifier.

We have found that it is possible to produce a reduced calorie coating based on a water-in-oil emulsion which has the same texture and flavour properties as required for conventional fat-based coatings and a significantly lower calorie content.

SUMMARY OF THE INVENTION

Accordingly, the present invention provides a water-in-oil emulsion for coating frozen dessert products, which comprises 40 to 55% by weight water and 2 to 4% by weight of an emulsifier system comprising a decaglycerine decafatty acid ester.

The invention further provides a method of production of a reduced calorie coating composition, which comprises separately mixing water with the preservative, aroma and sweetening agents at a low acidic pH to make the water phase, separately mixing a fat phase with the emulsifier decaglycerine decafatty acid ester at a temperature where the fat is liquid and introducing the water phase into the fat phase while thoroughly mixing, wherein the water phase represents 40 to 55% by weight and the emulsifier system 2 to 4% by weight of the final composition.

The invention further provides a method of coating a piece of frozen confectionery which comprises precooling it to a temperature of −30° C. or less and dipping the precooled piece in a reduced calorie coating composition in the form of a water-in-oil emulsion, which composition comprises 40 to 55% by weight water and 2 to 4% by weight of an emulsifier system comprising a decaglycerine decafatty acid ester.

The invention further provides a method of moulding pieces of frozen confectionery, which comprises ice-lining a mould by forming a coating of ice on the inside surface of said mould, inserting in the surface-iced mould a reduced calorie liquid coating and sucking back the excess liquid coating to form a shell, filling in the shell with ice cream, backing off with additional liquid coating, inserting a stick and demolding by defrosting the ice lining.

DETAILED DESCRIPTION OF THE INVENTION

In the context of the invention a coating composition is not limited to surface coating but also comprises using the coating in applications where alternate layers of ice confectionery and coating are made to create layered products. It may also be used to form solid pieces which may be used, for instance, in place of chocolate inclusions.

The frozen dessert material may be any dairy or non-dairy product, for instance ice cream, iced milk, frozen custard, frozen yoghurt or frozen mousse.

Advantageously, the emulsifier comprises decaglycerine decaoleate (DGDO) with a hydrophilic lipophilic balance (HLB) of preferably about 3.

Sugar and other water-soluble compounds (e.g. humectants) should not be present at levels exceeding about 3% by weight of the total coating composition in order to avoid softening of texture.

In specific applications, e.g. enrobing, additional viscosity building compounds may be added to thicken the coating composition, where a slightly higher viscosity is desirable. This may be obtained by adding a secondary emulsifier, preferably a sodium salt of phosphated mono- and di-glycerides, or a thickener, e.g. microcrystalline cellulose, preferably coated in carboxymethyl cellulose.

Other ingredients may be present including sweeteners, flavourings or colorants, the proportions of which may be determined according to taste and/or appearance. The sweetener may be for instance aspartame or sucralose. Cocoa solids non-fat which may come from cocoa liquor or cocoa powder may be used as flavourings and other flavor e.g. fruit, vanillin may also be added, depending on preference. When cocoa solids are used, these should contain only fine particles or the coating composition will have a coarse texture. Glycerol is preferably added to reduce the bitterness of the cocoa liquor/powder being used.

With respect to the fat phase, high melting point fats, such as cocoa butter or coconut fat may be used, to give the required snap to the coating composition.

The water phase may preferably contain a preservative, e.g. a sorbate and be acidified to about pH 4–4.5 in order to ensure that it will not support the growth of spoilage microorganisms.

The reduced calorie coating composition may further contain crispy inclusions e.g. cereals, like expanded or toasted rice or dried fruit pieces which must be coated in moisture barriers to delay the absorption of moisture from the coating, which would result eventually in their sogginess.

The reduced calorie coating composition is prepared to a similar manner to ice cream mix with identical equipment.

The method may comprise a pasteurizing step, e.g. in a high temperature short time (HTST) mix plant consisting of high shear mix tank, plate heating/cooling exchanger, holding tubes and optionally homogenizer. As an alternative the heat exchanger may comprise a shell and tube heating/cooling unit without homogenizer.

One may add viscosity building compounds to thicken the coating composition, where a slightly higher viscosity is desirable. This may be obtained by adding a secondary emulsifier, preferably a sodium salt of phosphated mono- and diglycerides, or a thickener, e.g. microcrystalline cellulose, preferably coated in carboxymethyl cellulose. and dipping the precooled piece in a reduced calorie coating composition in the form of a water-in-oil emulsion, which composition comprises 40 to 55% by weight water and 2 to 4% by weight of an emulsifier system comprising a decaglycerine decafatty acid ester.

In the coating method of the invention, dipping of the piece of frozen confection reduced calorie coating is followed by dipping the coated piece in an aqueous composition or spraying an aqueous composition on it to give an external layer of ice in order to protect it from moisture loss during storage. Moisture loss during storage is detrimental to quality of the finished product since it may induce surface bloom. As an alternative to this latter water dipping, one can use a system which will stop moisture loss at the surface, e.g. vacuum wrapping in a moisture tight package.

In a preferred embodiment of the moulding method of the invention, the coated piece is further dipped in an aqueous medium for avoiding moisture loss at the surface and the consecutive bloom.

Ice cream pieces may also be coated using an enrober.

In a first application of the reduced calorie coating, the coating composition is dropped onto a belt or band or into a mould followed by cooling to form solid pieces, e.g. drops of reduced calorie coating which can be used as inclusions in ice cream.

In a second application, the reduced calorie coating composition can be sprayed to form a film or layer on the surface of an ice cream product or films or layers inside an ice cream product to form a multilayered product.

In a further application of the reduced calorie coating composition, the liquid coating composition can be co-extruded with ice cream from a die to form a center or ripple.

EXAMPLES

The following Examples further illustrate the present invention, in which percentages and parts are expressed by weight unless otherwise specified.

Examples 1–2

A 140 kg batch of reduced calorie coating composition was prepared in a classical HTST ice cream mix plant consisting of high shear mix tank, plate heat exchanger (heating section), holding tube and plate heat exchanger (cooling section). After pasteurization, the coating composition was collected and stored until use in 50 kg agitated storage vessel jacketed to 40°–50° C.

A water phase was prepared by mixing water and potassium sorbate in HTST feed tank and a 85 % aqueous solution of phosphoric acid was added to reach a pH of 4,2. Caramel colour and gycerol were then added and the whole mixed at 50°–52° C. Vanillin and aspartame were then added shortly before the water phase was added to the fat phase.

A fat phase was separately prepared by mixing cocoa liquor and coconut oil and whenever required microcrystalline cellulose (Example 2) in a mixing tank at 52°–54° C. and an emulsifier was added.

The aqueous phase was progressively added to the fat phase under agitation, thus forming a water-in oil emulsion and the emulsion was pumped to the heating section of a plate heat exchanger heated at 81° C. with hot water, maintained 0,5 min. in a holding tube and then cooled at 48° C. in the cooling section of a plate heat exchanger, the total residence time in HTST system being about 6 min. for Example 1 and about 4 min. in Example 2. The ingredients of the composition are indicated in Table I below.

TABLE I

| Ingredients % | Examples | |
| --- | --- | --- |
| | 1 | 2 |
| Water | 45.5 | 46 |
| Coconut oil | 29.9 | 29.4 |
| Cocoa liquor | 19.6 | 19.6 |
| Decaglycerol decaoleate | 3.1 | 3.1 |
| Glycerol | 1 | 1 |
| Cellulose | — | 1 |
| Potassium sorbate | 0.12 | 0.12 |
| Phosphoric acid (85%) | 0.04 | 0.04 |
| Caramel color | 0.62 | 0.62 |
| Aspartame | 0.08 | 0.08 |
| Vanillin | 0.04 | 0.04 |
| Brookfield viscosity (cps./40° C./100 rpm) | 620 | 780 |

The coating composition of Example 2 (water-in-oil emulsion) was compared with two conventional coatings of respectively 45% and 60% fat content with respect to their calorie content. The results are summarized in Table II below.

TABLE II

| Component | Kcal/g | Conventional coating, 45% fat | Conventional coating, 60% fat | Water-in-oil emulsion |
| --- | --- | --- | --- | --- |
| Sucrose | 4 | 40 | 29 | — |
| Milk solids non-fat | 4 | 9 | 7 | — |
| Cocoa solids non-fat | 1.5 | 6 | 4 | 9 |
| Glycerol | 3 | — | — | 1 |
| Cellulose | — | — | — | 1 |
| Fats & emulsifiers | 9 | 45 | 60 | 44 |
| Water | — | — | — | 45 |
| Total calorie content Kcal/g | | 6.1 | 6.9 | 4.1 |

Example 3

A similar procedure to that described in Example 1 was followed except that pasteurization took place in a special low shear arrangement, using shell and tube heat exchangers comprising a heating section, a holding section and a cooling section, the residence time in the holding tube being 0.5 min. and the heating/cooling temperature conditions being 72° C./40° C. The coating composition had a Brookfield viscosity of 320 cps. (40° C./100 rpm).

Example 4

A similar procedure to that described in Example 2 was followed except that cocoa liquor was replaced by cocoa butter and the emulsifier by a blend of 2.6 of decaglycerol decaoleate and 0.5 % of phosphated monodiglyceride in the ingredients of the coating composition, the coating being white. The white coating composition may be dyed to give different colors.

Example 5

The reduced calorie coating compositions of Examples 1 to 4 were frozen and stored at −18° C. for future use. To reuse them, they were thawed out and thoroughly remixed at 40° C. and were found of excellent quality.

Example 6

Ice cream was extruded and cut into bars using an ice cream mix with 58.5 % water, 31.9 % solids non-fat, 9.6 % fat and 20–30 % overrun. The bars were then passed through a liquid nitrogen tunnel (Zip freeze) and cooled at −80° C. for 3 min. Finally the bars were enrobed with the reduced calorie coating composition of Example 2 at 38° C. The bars obtained were adequately covered with a uniform layer of coating which stuck properly to the bar surface. After coating, the bars were sprayed with water at 5–15° C. and flow-wrapped. On storage at −22° C. there was no loss of moisture and no fat bloom could be observed. This method was also suitable for preparing bite-size pieces.

Example 7

Cells of a stick machine in a brine tank of −38° C. were coated on the inside with a thin film of ice by spraying water mist into them. The moulds were then filled with the reduced calorie coating composition of Example 1 at 40° C. After 10 s, excess coating composition was sucked-back and ice cream of 80 % overrun was deposited at −2.5° C. into the thus formed ice shells. After insertion of sticks and backing off with more reduced calorie coating at 40° C., the ice sticks were demoulded by defrosting the ice lining at 120° C. and finally given a water dip at 15° C. and flow-wrapped.

Example 8

The coating of Example 1 was sprayed as thin film alternate coating layers in an ice cream cone to form a layered article. This method was also suitable for preparing layered sundae cups and bulk ice creams.

Example 9

The coating of Example 1 was drop moulded by depositing in small beads on a steel band cooled at −20° C. to give small tear-shaped pieces which were further cooled in a tunnel and stored at −20° C. These pieces can be used as inclusions in ice cream.

Example 10

The method of Example 9 was carried out but the coating was deposited in small moulds. After cooling, the small pieces were demoulded.

We claim:

1. A process for preparing a reduced-calorie coated frozen confectionery comprising coating a frozen confectionery with a water-in-oil emulsion, wherein the emulsion comprises 40% to 55% by weight water, 2% to 4% by weight of an emulsifier system comprising decaglycerine decaoleate, and less than about 3% by weight water-soluble compounds.

2. A process according to claim 1 wherein the decaglycerine decaoleate has a hydrophilic/lipophilic balance of about 3.

3. A process according to claim 1 or 2 further comprising cooling the confectionery to a temperature of −30° C. or lower before coating the confectionery.

4. A process according to claim 1 or 2 wherein the water-in-oil emulsion is sprayed on the confectionery.

5. A process according to claim 1 or 2 wherein the confectionery is dipped in the water-in-oil emulsion.

6. A process according to claim 1 or 2 wherein the frozen confectionery is a member selected from the group consisting of ice cream, iced milk, frozen custard, frozen yogurt and frozen mousse.

7. A process according to claim 1 or 2 wherein the water-in-oil emulsion contains cocoa butter.

8. A process according to claim 1 or 2 wherein the water-in-oil emulsion contains coconut fat.

9. A process according to claim 1 or 2 wherein the water-in-oil emulsion further comprises microcrystalline cellulose.

10. A process according to claim 9 wherein the microcrystalline cellulose is coated in carboxymethyl cellulose.

11. A process according to claim 1 or 2 wherein the water-in-oil emulsion further comprises glycerol.

* * * * *